(No Model.)
W. H. BRISTOL.
CAMERA.
No. 424,402.  Patented Mar. 25, 1890.
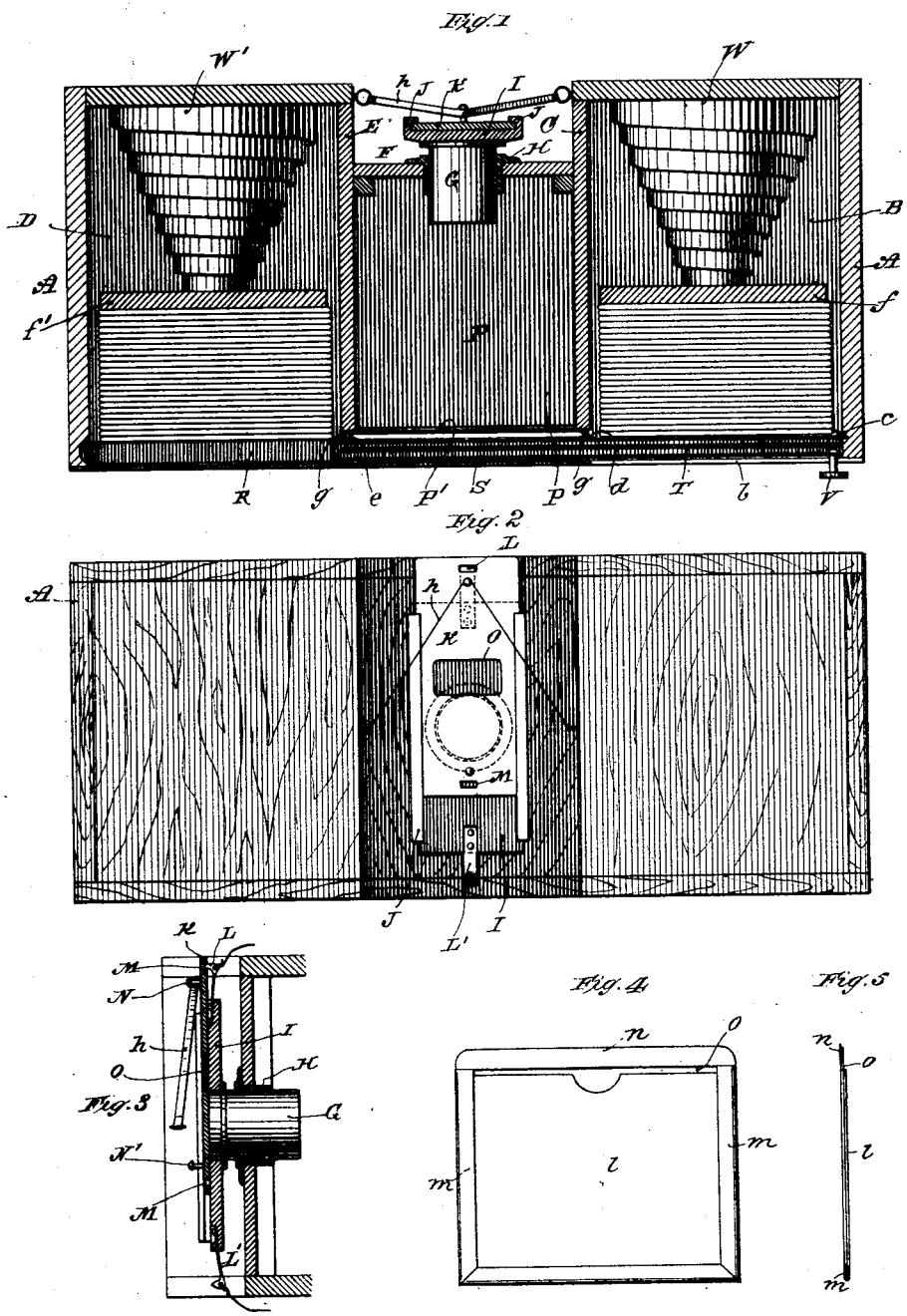
Witnesses:
Ernest Hopkinson
Frank E. Hartley
Inventor
William H. Bristol
By Duncan, Curtis & Page
Attorneys.

UNITED STATES PATENT OFFICE.

WILLIAM H. BRISTOL, OF HOBOKEN, NEW JERSEY.

CAMERA.

SPECIFICATION forming part of Letters Patent No. 424,402, dated March 25, 1890.

Application filed June 4, 1889. Serial No. 313,046. (No model.)

*To all whom it may concern:*

Be it known that I, WILLIAM H. BRISTOL, a citizen of the United States, residing at Hoboken, in the county of Hudson and State of New Jersey, have invented certain new and useful Improvements in Cameras, of which the following is a specification, reference being had to the drawings accompanying and forming a part of the same.

The object of my invention is to construct a repeating-camera at small cost, which shall be more simple, effective, and easily managed or used than those which have heretofore been made. I have therefore made an instrument of the following description: I construct a box of desired size, which I divide into three compartments. That at one end is for containing the unexposed and that at the other the exposed plates, while the central or intermediate compartment is adapted to contain a single plate, holding it in position for exposure. I provide a device which in construction is novel to shift the plates from one compartment to another, and means for excluding light from the plates.

In this apparatus the parts or features which constitute my invention are mainly in the combination, with the camera divided as set forth, of the special means, hereinafter described, for shifting or transferring the plates from one compartment to the other.

I prefer to use celluloid or similar films in lieu of glass plates, and I have devised a special form of holder for such plates. I also employ springs to bear upon and retain the plates in proper position and a novel device for shifting and controlling the slide for giving the exposure.

This apparatus is illustrated in the accompanying drawings.

Figure 1 is a view of the interior of the camera; Fig. 2, a front view of the same; Fig. 3, a sectional view of the shutter mechanism. Fig. 4 is a side elevation of a plate-holder, and Fig. 5 a vertical section of the same.

A is the box or case, which may be of any proper material and appropriate design, and provided, if so desired, with a handle. This box is divided into compartments by suitable partitions. One of these compartments, as B, is for containing the unexposed plates and is formed by the partition C. Another compartment, as D, is formed at the opposite end of the box by a partition E, and is the receptacle for the plates after exposure. The intermediate space between the partitions C and E is inclosed by a plate F, and forms the camera-chamber proper, in which the plates are held for exposure. In the front plate or wall F is the lens-tube G, arranged in a suitable guide or sleeve H and capable of adjustment for focus in any ordinary or desired manner. The forward end of the lens-tube or holder carries a plate I, with rails or guides J, between which the shutter K is adapted to slide. To the opposite ends of the plate I are secured spring-catches L L', which engage with small holes or depressions M in the shutter, when the latter is in either of its normal positions. Pins N N' are set in the shutter, near its ends, and a rubber band $h$ is secured to the edges of the plate I, the sides or partitions C E, or other convenient points, whereby it may be passed over said pins for shifting the shutter, as hereinafter set forth. The shutter is provided with the usual opening O, which gives the necessary exposure as in the movement of the shutter it passes the open lens-holder. At the rear of the compartment P are slots or openings $g$ in the partition C E, of sufficient width to permit the passage of a plate and its holder from one compartment to another.

R is a groove in the rear wall of the camera and extending the entire length of the same. In this groove is a strip of brass or other resilient metal S, bent back upon itself, as shown, and extending across two of the compartments. A strip or sheet of tin T is secured in the groove R, between the two ends or parts of the bent strip S, so that whatever the position of the strip all light is effectually excluded. A pin V is set in the under side of the strip S, near its end, and extends through a slot $b$ in the box A. The opposite end of the strip S is provided with a hook or shoulder $c$, of sufficient prominence to engage with but a single plate or plate-holder at a time. On the upper side of the strip S is also a shoulder or catch $d$, at the distance from the shoulder $c$ slightly greater than the width or length of a plate or plate-holder. A third projection $e$ is formed on or applied to the upper side of the strip S, near the bend therein, the purpose of which will hereinafter appear.

In the compartment B a given number of plates or holders containing plates are introduced under a plate $f$, upon which bears a spring W, secured to the front side or wall of the compartment. The pressure exerted by this spring or any equivalent device which may be employed in its stead forces the pile of plates against the rear wall of the compartment. The pin V is then pushed along the slot $b$, moving the strip or carrier S through a space equal to the width of one of the compartments. In this movement the shoulder $c$ engages with the edge of the lowermost plate in compartment B, and shifts it into compartment P through the opening in or back of partition C. It is to be observed that the strip S having a certain resilience its end has a tendency to rise up from the groove in which it is contained and engage with the lowermost plate in the pile above it. When a plate is shifted into the intermediate compartment, it is held in position therein by any convenient device, such as guides at top and bottom of the compartment. I have indicated one of these by P' in Fig. 1. A plate being thus brought to position the carrier S is drawn back by moving the pin V in its slot. The inclined surface of the shoulder $d$ slips under the transferred plate without moving it, and the carrier comes back until the shoulder $c$ engages with another plate in the compartment B. I have found that the plates once moved forward from the compartment B are not likely to be moved back by the return of the carrier constructed as described. Should there be any such tendency, however, it may easily be prevented by employing suitable spring-catches to prevent the backward movement of the plates. The apparatus is now in condition for exposing the plate. The rubber strap $h$ is then passed over the pin N, supposing the parts to be in the position shown in Fig. 2. The camera being then directed toward the object to be photographed, the string attached to the spring-catch L is pulled and the shutter shifted to its opposite position, engaging with catch L'. The plate thus exposed is transferred to the compartment D by pushing forward the pin V in its slot.

In order to retain the plates in compartment D in position, I employ a plate $f'$, upon which bears a spring W', similar to the spring W in compartment B.

When the carrier S is pushed forward, the prominence or projection $e$ raises the said plate $f'$ to make room for the exposed plate carried forward by the shoulder $d$ on the carrier S. The same movement of the carrier transfers from compartment B a fresh plate into position for exposure.

In lieu of glass plates I prefer to use thin, flexible, transparent or translucent plates, such as are made of celluloid, and for these I have devised a special holder, which is illustrated in Figs. 4 and 5. This holder is made of a sheet of tin $l$, the sides and lower edge of which are bent over to form a receptacle or holder into which the plate or film is slipped. The lapping edges $m$ $m$ extend above the upper edge of the plate $l$, and to them is soldered a cross-piece $n$, leaving a space $o$. The cross-piece $n$ serves to hold the film flat in the holder, and the space $o$ permits the film, when withdrawn for developing, to bend back, so that the sensitive surface will not come in contact with the piece $n$.

By the above-described plan a small, compact, and light camera may be constructed which will carry a large number of plates.

The manipulation of the apparatus is extremely simple and easy, and the control of the plates positive, while a change of plates may be effected almost instantly.

The camera may be held in any position while in use.

I have described in detail the specific construction of one form of my invention. It may be proper, however, to remark that I do not restrict myself to such details. For example, I may employ any means in place of the springs W W' to exert automatically the requisite pressure upon the plates. I may also use other forms of shutter and means for shifting the same, and certain parts—such as the camera S—may be duplicated without departure from the invention when the necessities of the case require it.

I am aware that cameras divided into compartments and provided with means for transferring plates from one compartment to another are not broadly new.

What I claim is—

1. The combination, with a camera formed with a central compartment for containing the plates to be exposed, and a compartment on each side—one for containing the plates before and the other after exposure—a sliding carrier for transferring the plates from one compartment to the other through openings at the rear of the same, the said carrier being formed or provided with lugs or projections adapted to engage with an unexposed plate and with the plate in the central chamber, respectively, whereby the said plates may be shifted positively and directly by the movement of the carrier, as set forth.

2. The combination, with the camera divided into three compartments, of spring-supports for the plates located in the end compartments, and a sliding carrier for transferring the plates through openings at the rear of the compartments, the said carrier being provided with three projections or lugs—one in position to engage with the lowermost plate in one end compartment, another in position to engage with the edge of a plate in the central compartment, and the third being adapted to slide under and raise the plates in the third compartment when the carrier is shifted to transfer a plate, as herein set forth.

3. The combination of the plate-supporting devices in compartments B and D, the strip or carrier S, bent back upon itself and adapted to engage with the plates in said compartments, and the shield or plate T, for cutting off the light, inserted in the groove containing the carrier and between the two sides of the said carrier, as set forth.

4. The combination, in a camera containing three compartments, as set forth, of the plates $f$ and springs W W' contained in the end compartments and forming supports for the plates or plate-holders, the strip or carrier S, bent back upon itself and provided with shoulders to engage with and transfer the plates from one compartment to another, and provided with a pin V, extending through a slot in the rear of the camera, and the light shield or strip T in the groove R between the two sides of the carrier S, as set forth.

WILLIAM H. BRISTOL.

Witnesses:
A. RIESENBERGER,
B. B. BRISTOL.